United States Patent
Bleichenbacher et al.

(10) Patent No.: US 6,735,313 B1
(45) Date of Patent: May 11, 2004

(54) CRYPTOGRAPHIC METHOD AND APPARATUS FOR RESTRICTING ACCESS TO TRANSMITTED PROGRAMMING CONTENT USING HASH FUNCTIONS AND PROGRAM IDENTIFIERS

(75) Inventors: Daniel Bleichenbacher, Summit, NJ (US); Avishai Wool, Livingston, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/307,643

(22) Filed: May 7, 1999

(51) Int. Cl.[7] .............................. H04N 7/167; H04L 9/00
(52) U.S. Cl. ........................................ 380/241; 380/45
(58) Field of Search ................. 380/241, 240, 380/210, 44, 45, 46, 239

(56) References Cited

U.S. PATENT DOCUMENTS

| | | | |
|---|---|---|---|
| 4,309,569 A | * 1/1982 | Merkle | 713/177 |
| 4,388,643 A | 6/1983 | Aminetzah | |
| 4,872,200 A | * 10/1989 | Jansen | 380/34 |
| 4,887,296 A | 12/1989 | Horne | |
| 4,932,056 A | 6/1990 | Shamir | |
| 4,995,082 A | 2/1991 | Schnorr | |
| 5,381,481 A | * 1/1995 | Gammie et al. | 380/212 |
| 5,418,947 A | * 5/1995 | Hsu et al. | 707/1 |
| 5,432,852 A | 7/1995 | Leighton et al. | |
| 5,434,919 A | * 7/1995 | Chaum | 380/30 |
| 5,481,609 A | 1/1996 | Cohen et al. | |
| 5,485,577 A | * 1/1996 | Eyer et al. | 713/202 |
| 5,502,767 A | * 3/1996 | Sasuta et al. | 380/274 |
| 5,608,801 A | 3/1997 | Aiello et al. | |
| 5,615,265 A | 3/1997 | Coutrot | |
| 5,761,669 A | 6/1998 | Montague et al. | |
| 5,903,649 A | * 5/1999 | Schwenk | 713/180 |
| 6,097,811 A | * 8/2000 | Micali | 713/186 |
| 6,222,923 B1 | * 4/2001 | Schwenk | 380/44 |
| 6,373,948 B1 | * 4/2002 | Wool | 380/241 |
| 6,487,720 B1 | * 11/2002 | Ohishi | 725/31 |

FOREIGN PATENT DOCUMENTS

| EP | 0 343 805 A2 | 5/1989 |
|---|---|---|
| EP | 0 450 841 A2 | 3/1991 |

OTHER PUBLICATIONS

J. McCormac, European Scrambling Systems, Circuits Tactics and Techniques ("The Black Book"), Waterford University Press, pp. 2–79, 4–10 and 4–11 (1996).

O. Goldreich et al., How to Construct Random Functions, J. of Ass'n for Computing Machinery, vol. 33, No. 4, 792–807 (Oct. 1986).

Guillou et al. "Encipherment and Conditional Access" SMPTE Journal, vol. 103, No. 6, 398–406, Jun. 1994.

* cited by examiner

*Primary Examiner*—Gilberto Barrón
*Assistant Examiner*—Douglas J Meislahn

(57) ABSTRACT

A system for restricting access to transmitted programming content is disclosed, which transmits a program identifier with the encrypted programming content. A set-top terminal or similar mechanism restricts access to the transmitted multimedia information using stored decryption keys. The set-top terminal receives entitlement information periodically from the head-end, corresponding to one or more packages of programs that the customer is entitled to for a given period. Each program is encrypted by the head-end server prior to transmission, using a program key, $K_p$, which may be unique to the program. The set-top terminal uses the received program identifier, p, together with the stored entitlement information, to derive the decryption key necessary to decrypt the program. Each of the k-bit program keys, $K_p$, used to encrypt transmitted programs is obtained by applying one or more pseudo-random hash functions, H, such as a length-doubling hash function, H, to a master key, m.

29 Claims, 7 Drawing Sheets

PROGRAM DATABASE 500

| PROGRAM | PACKAGE NAMES | PROGRAM IDENTIFIER |
|---|---|---|
| 505 — WORLD SERIES GAME 5 | SPORTS, PROFESSIONAL BASEBALL, PLAYOFF GAMES | $p^1$ |
| 510 — SUPER BOWL | SPORTS, PROFESSIONAL FOOTBALL, PLAYOFF GAMES | $p^2$ |
| 515 — SOUND OF MUSIC | MOVIES, MUSICALS | $p^3$ |
| 520 — SESAME STREET, EPISODE NO. 554 | CHILDREN'S PROGRAMMING; EDUCATIONAL PROGRAMMING | $p^4$ |

FIG. 6

ENTITLEMENT DATABASE 600

| NODE | KEY VALUE | PARTIAL PROGRAM IDENTIFIER, p |
|---|---|---|
| 220 | $K_{I_0}$ | 0 |
| 236 | $K_{I_{11}}$ | 11 |

CRYPTOGRAPHIC METHOD AND APPARATUS FOR RESTRICTING ACCESS TO TRANSMITTED PROGRAMMING CONTENT USING HASH FUNCTIONS AND PROGRAM IDENTIFIERS

FIELD OF THE INVENTION

The present invention relates generally to a system for restricting access to transmitted programming content, and more particularly, to a system for transmitting an encrypted program together with a program identifier which is used by a set-top terminal, together with stored entitlement information, to derive the decryption key necessary to decrypt the program.

BACKGROUND OF THE INVENTION

As the number of channels available to television viewers has increased, along with the diversity of the programming content available on such channels, it has become increasingly challenging for service providers, such as cable television operators and digital satellite service operators, to offer packages of channels and programs that satisfy the majority of the television viewing population. The development of packages that may be offered to customers is generally a marketing function. Generally, a service provider desires to offer packages of various sizes, from a single program to all the programs, and various combinations in between.

The service provider typically broadcasts the television programs from a transmitter, often referred to as the "head-end," to a large population of customers. Each customer is typically entitled only to a subset of the received programming, associated with purchased packages. In a wireless broadcast environment, for example, the transmitted programming can be received by anyone with an appropriate receiver, such as an antenna or a satellite dish. Thus, in order to restrict access to a transmitted program to authorized customers who have purchased the required package, the service provider typically encrypts the transmitted programs and provides the customer with a set-top terminal (STT) containing one or more decryption keys which may be utilized to decrypt programs that a customer is entitled to. In this manner, the set-top terminal receives encrypted transmissions and decrypts the programs that the customer is entitled to, but nothing else.

In order to minimize piracy of the highly sensitive information stored in the set-top terminals, including the stored decryption keys, the set-top terminals typically contain a secure processor and secure memory, typically having a capacity on the order of a few kilobits, to store the decryption keys. The secure memory is generally non-volatile, and tamper-resistant. In addition, the secure memory is preferably writable, so that the keys may be reprogrammed as desired, for example, for each billing period. The limited secure memory capacity of conventional set-top terminals limits the number of keys that may be stored and thereby limits the number of packages which may be offered by a service provider. It is noted that the number of programs typically broadcast by a service provider during a monthly billing period can be on the order of 200,000.

In one variation, conventional set-top terminals contain a bit vector having a bit entry corresponding to each package of programs offered by the service provider. If a particular customer is entitled to a package, the corresponding bit entry in the bit vector stored in the set-top terminal is set to one ("1"). Thereafter, all programs transmitted by the service provider are encrypted with a single key. Upon receipt of a given program, the set-top terminal accesses the bit vector to determine if the corresponding bit entry has been set. If the bit entry has been set, the set-top terminal utilizes a single stored decryption key to decrypt the program. While, in theory, flexibility is achieved in the bit vector scheme by providing a bit entry for each package (a package generally consists of one program), the length of the bit vector would be impractical in a system transmitting many programs in a single billing period. In addition, access control in such a system is provided exclusively by the entries in the bit vector and is not cryptographic. Thus, if a customer is able to overwrite the bit vector, and set all bits to one ("1"), then the customer obtains access to all programs.

In a further variation, programs are divided into packages, and all programs in a given package are encrypted using the same key. Again, each package typically corresponds to one television channel. The set-top terminal stores a decryption key for each package the customer is entitled to. Thus, if a program is to be included in a plurality of packages, then the program must be retransmitted for each associated package, with each transmission encrypted with the encryption key corresponding to the particular package. Although the access control is cryptographic, the overhead associated with retransmitting a given program a number of times discourages service providers from placing the same program in a number of packages and thereby limits flexibility in designing packages of programs.

While such previous systems for encrypting and transmitting programming content have been relatively successful in restricting access to authorized customers, they do not permit a service provider, such as a television network, to offer many different packages containing various numbers of programs to customers, without exceeding the limited secure memory capacity of the set-top terminal or significantly increasing the overhead. U.S. patent application Ser. No. 08/912,186, filed Aug. 15, 1997 and assigned to the assignee of the present invention, hereinafter referred to as the "Vspace System," discloses a cryptographic method and apparatus for restricting access to transmitted programming content.

Each program in the Vspace System is encrypted by the head-end server prior to transmission, using a program key, $K_p$. Each of the program keys is a linear combination of a defined set of master keys, M. A program identifier identifying the program is transmitted with the encrypted programming content. The customer's set-top terminal can derive the decryption key from only the received program identifier, p, and previously stored entitlement information. The Vspace System provides a cryptographic access control mechanism, while permitting flexible packages (since the program does not need to be retransmitted for each associated package) without significantly extending the program header (only the program identifier is transmitted with the program).

SUMMARY OF THE INVENTION

Generally, encrypted programming content is transmitted by a service provider using a transmitter, or head-end server, to one or more customers. According to one aspect of the invention, a program identifier, p, used to identify the program is transmitted to the customer with the programming content. Each customer has a set-top terminal or another mechanism to restrict access to the transmitted multimedia information using decryption keys. The set-top terminal receives entitlement information from the head-end, corresponding to one or more packages of programs that the customer is entitled to for a given period.

Each program is encrypted by the head-end server prior to transmission, using a program key, $K_p$, which may be unique to the program. In addition to transmitting the encrypted program, the head-end server transmits the program identifier, p, to the set-top terminal. The set-top terminal uses the received program identifier, p, together with the stored entitlement information, to derive the decryption key necessary to decrypt the program. In this manner, if a customer is entitled to a particular program, the set-top terminal will be able to derive the encrypted program key, $K_p$, using the stored and received information, and thereafter use the program key, $K_p$, to decrypt the encrypted program. In various embodiments, the program identifier, p, can be interleaved with the program portion or transmitted on a separate dedicated control channel.

According to one aspect of the invention, each of the k-bit program keys, $K_p$, used to encrypt transmitted programs is obtained by applying one or more pseudo-random hash functions, H, to a master key, m. In one implementation, a length-doubling hash function, H, is utilized. Thus, the hash function, H, takes a k-bit binary value and produces a binary value having a length of 2k. The output of the hash function, H, can be represented as a pair of k-bit binary values, $H_0$ and $H_1$, where $H_0$ is referred to as the left half of the output of the hash function, and $H_1$ is the right half of the output of the hash function.

In an illustrative implementation, a program key, $K_p$, is obtained by recursively applying a hash function, $H_0$ or $H_1$, to the master key, m, depending on the corresponding binary value of each bit position of the program identifier, p. Thus, if the program identifier, p, consists of n bits, one of the hash functions, $H_0$ or $H_1$, is applied for each of the n bit positions of the program identifier, p, depending on the corresponding bit value of the program identifier, p. Initially, one of the hash functions, $H_0$ or $H_1$, is applied to the master key, m, depending on the binary value of the most significant bit of the program identifier, p. Thereafter, for each of the remaining (n−1) bit positions, one of the hash functions, $H_0$ or $H_1$, is applied to the result of the previous hash operation, depending on the binary value of the corresponding bit. The calculation of the program key, $K_p$ can be represented as follows:

$$K_p = H_{p_n}(\ldots H_{p_2}(H_{p_1}(m))\ldots).$$

The hash operation can be represented in terms of an n-level binary tree, T, referred to as the key tree, with the master key, m, placed at the root of the tree. The tree is generated by applying the hash functions $H_0$ and $H_1$ to each node, until the desired number of tree levels (n) have been created. The program keys, $K_p$, correspond to the leaf nodes at the bottom level of the tree. The binary index (and likewise the program identifiers, p) associated with each program key, $K_p$, corresponds to the path through the key tree from the root to the desired leaf node. Thus, the index or label of a given node, u, is the concatenation of the labels on the edges on the path from the root to the node u. T(u) denotes the subtree rooted at node u, or the set of program identifiers, p, corresponding to the leaves in the subtree of node u. For an internal node, u, at depth r in the key tree, with a partial program identifier, p, $(u_1, \ldots, u_r)$, the keys of any program in the subtree T(u) can be computed by activating the hash function n−r times.

A more complete understanding of the present invention, as well as further features and advantages of the present invention, will be obtained by reference to the following detailed description and drawings.

DETAILED DESCRIPTION

Figure 1:
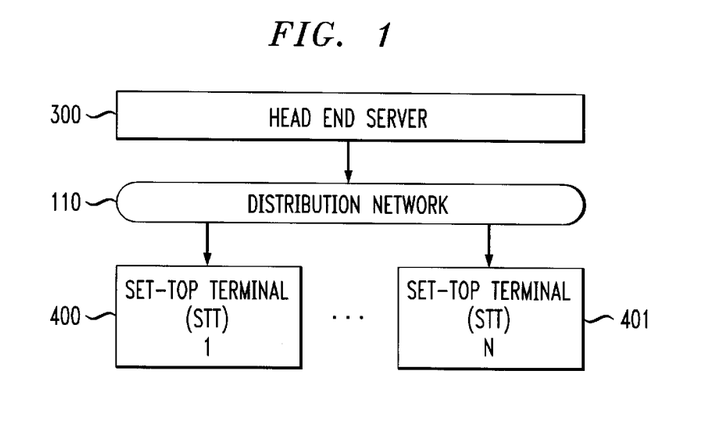
FIG. 1 is a schematic block diagram illustrating a system for transmitting encrypted programming content in accordance with one embodiment of the present invention.

FIG. 1 shows an illustrative network environment for transferring encrypted multimedia information, such as video, audio and data, from a service provider using a transmitter, such as a head-end server 300, discussed further below in conjunction with FIG. 3, to one or more customers having set-top terminals 400–401, such as the set-top terminal 400, discussed further below in conjunction with FIG. 4, over one or more distribution networks 110. As used herein, a set-top terminal includes any mechanism to restrict access to the transmitted multimedia information using decryption keys, including, for example, a computer configuration or a telecommunications device. It is possible for software executed by the set-top terminal to be downloaded by the service provider. The distribution network 110 can be a wireless broadcast network for distribution of programming content, such as a digital satellite service ("DSS™"), or a conventional wired network, such as the cable television network ("CATV"), the Public Switched Telephone Network ("PSTN"), an optical network, a broadband integrated services digital network ("ISDN") or the Internet.

According to a feature of the present invention, the set-top terminal 400 intermittently receives entitlement information from the head-end server 300, which permits a customer to access programs that the customer is entitled to for a given time interval, such as a billing period. As used herein, a package is a predefined set of programs, and a given program can belong to one or more packages. A program is any continuous multimedia transmission of a particular length, such as a television episode or a movie. The entitlement information can be downloaded from the head-end server 300 to the set-top terminal 400 using any suitably secure uni-directional or bi-directional protocol, as would be apparent to a person of ordinary skill.

Program Keys and Program Identifiers

As discussed further below, each transmitted program is encrypted by the head-end server 300 using a program key, $K_p$, which may be unique to the program. For a detailed discussion of suitable encryption and security techniques, see B. Schneier, Applied Cryptography (2d ed. 1997), incorporated by reference herein. In addition to transmitting the encrypted program, the head-end server 300 also transmits an n-bit program identifier, p, to the set-top terminals 400, which may be utilized by the set-top terminal 400, together with stored entitlement information, to derive the decryption key necessary to decrypt the program, in a manner described further below. As discussed below in a section entitled ASSIGNING PROGRAM IDENTIFIERS TO PROGRAMS, the program identifiers, p, are not chosen arbitrarily. In one preferred embodiment, the program identifier, p, consists of a thirty-two (32) bit value that may be transmitted, for example, in the ECM field defined in the MPEG-2 standard. In this manner, if a customer is entitled to a particular program, the set-top terminal 400 will be able to derive the program key, $K_p$, from stored and received information, and thereafter use the program key, $K_p$, to decrypt the encrypted program.

According to a further feature of the present invention, each of the k-bit program keys, $K_p$, used to encrypt transmitted programs is obtained by applying one or more pseudo-random hash functions to a master key, m. For a detailed discussion of suitable pseudo-random hash functions, see, for example, O. Goldreich et al., "How to Construct Random Functions," J. ACM, 33:792–807 (1986), incorporated by reference herein.

In one implementation, a crytographically-secure, length doubling, hash function is utilized, as follows:

$$H: \{0,1\}^k \to \{0,1\}^{2k},$$

where, k is the length of the program key, $K_p$. Thus, the hash function, H, takes a k-bit binary value and produces a binary value having a length of 2k. The output of the hash function, H, can be represented as a pair of k-bit binary values, $H_0$ and $H_1$, where $H_0$ is referred to as the left half of the output of the hash function, H (most significant bits), and $H_1$ is the right half of the output of the hash function, H (most significant bits). $H_0$ and $H_1$ can be said to be separate hash functions. In one illustrative implementation, when k equals 160, H could be defined by using the secret hash standard, SHA-1, as defined in Secure Hash Standard, National Institute of Standards and Technology, NIST FIPS PUB 180-1, U.S. Dept. of Commerce (April, 1995), incorporated by reference herein. In other words, $H_0$ equals SHA-1 (x∥0), and $H_1$ equals SHA-1 (x∥1), where 0 and 1 are all-zero and all-one bit strings, respectively.

According to a further feature of the present invention, a program key, $K_p$, is obtained by recursively applying one or more hash functions to the master key, m, depending on the binary value of the program identifier, p. In one implementation, the program key, $K_p$, is obtained by recursively applying one of the hash functions, $H_0$ or $H_1$, to the master key, m, depending on the binary value of each bit position of the program identifier, p. Generally, if the program identifier, p, consists of n bits, one of the hash functions, $H_0$ or $H_1$, is applied for each of the n bit positions of the program identifier, p, (starting with the most significant bit) depending on the corresponding bit value of the program identifier, p. Initially, one of the hash functions, $H_0$ or $H_1$, is applied to the master key, m, depending on the binary value of the most significant bit. Thereafter, for each of the remaining (n−1) bit positions, one of the hash functions, $H_0$ or $H_1$, is applied to the result of the previous hash operation, depending on the binary value of the corresponding bit. As discussed below in a section entitled THE KEY TREE, the hash operation can be represented as follows:

$$K_p = H_{p_n}(\ldots H_{p_2}(H_{p_1}(m)) \ldots).$$

As previously indicated, the head-end server 300 will transmit the program identifier, p, with the encrypted program. Thus, given the program identifier, p, the set-top terminal 400 must obtain the program key, $K_p$, used to decrypt the received program. As previously indicated, the program key, $K_p$, is obtained by recursively applying one or more hash functions to a master key, m, depending on the binary value of the program identifier, p. The program keys, $K_p$, must be obtained by the customer's set-top terminal 400 indirectly using the stored entitlement information, discussed below, and the received program identifier, p.

The Key Tree

As previously indicated, a program key, $K_p$, is obtained by recursively applying one or more hash functions, H, to a master key, m, depending on the binary value of the program identifier, p. A single k-bit master key, m, is utilized. The bits of the program identifier, p, are denoted by $p=(p_1, \ldots, p_n)$, where $p_1$ is the most significant bit and $p_n$ is the least significant bit. According to a feature of the present invention, the encryption key, $K_p$, for a program with a program identifier, p, is defined as follows:

$$K_p = H_{p_n}(\ldots H_{p_2}(H_{p_1}(m)) \ldots).$$

Figure 2:
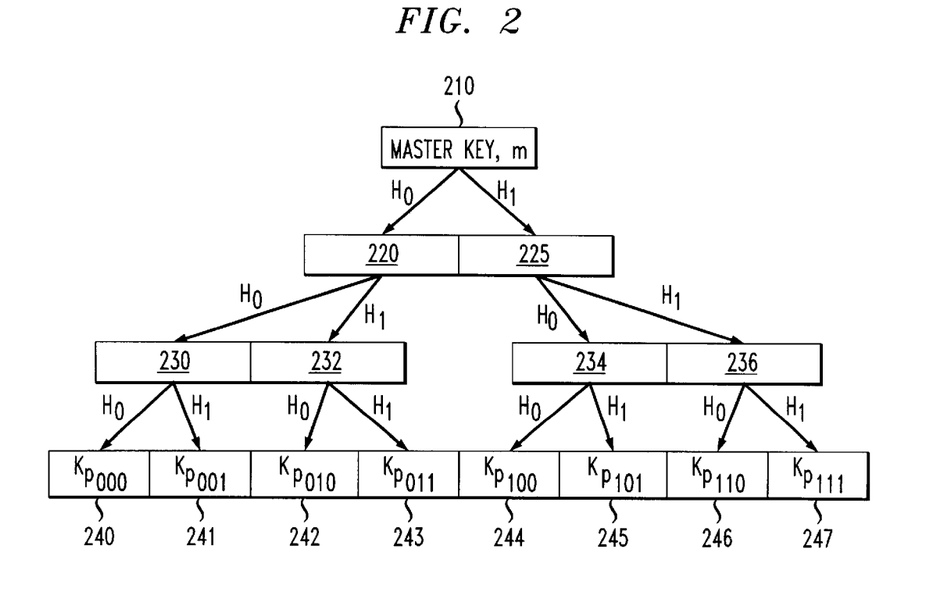
FIG. 2 is a conceptual representation of an exemplary key tree in accordance with the present invention.

The hash operation can also be represented in terms of a full n-level binary tree T, referred to as the key tree 200, shown in FIG. 2. The illustrative key tree 200, shown in FIG. 2, corresponds to an implementation having program identifiers, p, consisting of three bits. As shown in FIG. 2, the master key, m, is placed at the root 210 of the tree 200. The program keys, $K_p$, correspond to the leaf nodes, such as the leaf nodes 240–247. The index associated with each program key, $K_p$, shown in FIG. 2, such as the index 011 associated with the program key, $K_p$, of the leaf node 243, indicates the path through the key tree 200 from the root 210 to the leaf node 243. For example, the program key, $K_p$, of the leaf node 243 is obtained by following a left edge ($H_0$) from the root 210, a right edge ($H_1$) from the node 220 and a right edge ($H_1$) from the node 232. In other words, $H_0$ is initially applied to the master key, m, then $H_1$ is applied to a first hash result, and $H_1$ is again applied to the second hash result. The resulting value is the program key, $K_{p_{011}}$.

Thus, the label of a given node, u, such as the node 243, is the concatenation of the labels on the edges on the path from the root 210 to the node u. The label of each node can be identified with the program identifiers, p. T(u) is utilized to denote the subtree rooted at node u, or equivalently, to denote the set of program identifiers, p, corresponding to the leaves in the subtree of node u. For an internal node, u, at depth r in the key tree 200, with a partial program identifier, $p, (u_1, \ldots, u_r)$, the keys of any program in the subtree T(u) can be computed. The key of any program in the subtree of node u is computed by activating the hash function n−r times. Specifically, the appropriate hash function, $H_0$ or $H_1$, is utilized as directed by the value of each of the n−r low order bits of the program identifier, p. Thus, the program key, $K_p$, corresponding to a node u can serve as an entitlement for all programs in the subtree of node u.

If the function H is a pseudo-random generator, then the mapping of the program keys, $K_p$ $\{0,1\}^n \to \{0,1\}^k$, parameterized by the master key, m, is a pseudo-random function.

See, for example, O. Goldreich et al., "How to Construct Random Functions," J. ACM, 33:792–807 (1986), incorporated by reference above.

System Components

Figure 3:
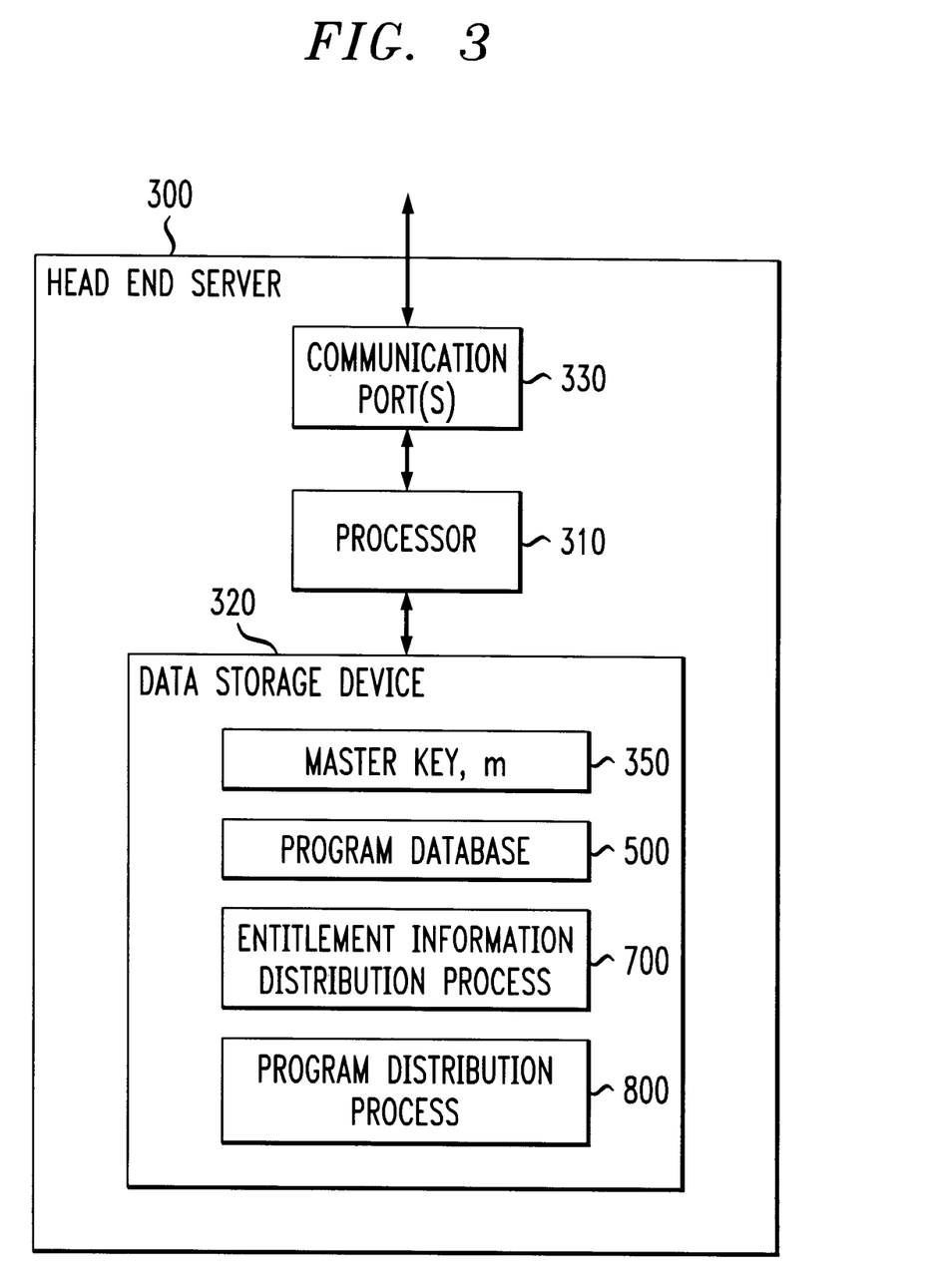
FIG. 3 is a schematic block diagram of an exemplary head-end server of FIG. 1.

FIG. 3 is a block diagram showing the architecture of an illustrative head-end server 300. The head end may be associated with a television network, a cable operator, a digital satellite service operator, or any service provider transmitting encrypted programming content. The head-end server 300 may be embodied, for example, as an RS 6000 server, manufactured by IBM Corp., as modified herein to execute the functions and operations of the present invention. The head-end server 300 includes a processor 310 and related memory, such as a data storage device 320. The processor 310 may be embodied as a single processor, or a number of processors operating in parallel. The data storage device 320 and/or a read only memory (ROM) are operable to store one or more instructions, which the processor 310 is operable to retrieve, interpret and execute.

As discussed above, the data storage device 320 includes a master key database 350 for storing the master key, m. The master key, m, may be updated, for example, once per billing period. In addition, as discussed further below in conjunction with FIG. 5, the data storage device 320 includes a program database 500. The program database 500 indicates the program identifier, p, and associated packages corresponding to each program. In addition, as discussed further below in conjunction with FIGS. 7 AND 8, the data storage device 320 includes an entitlement information distribution process 700 and a program distribution process 800. Generally, the entitlement information distribution process 700 generates and distributes the entitlement information required by each customer to access entitled programs. In addition, the program distribution process 800 derives the program key, $K_p$, based on the program identifier, p, assigned to the program in order to encrypt and transmit the program with the program identifier, p.

The communications port 330 connects the head-end server 300 to the distribution network 110, thereby linking the head-end server 300 to each connected receiver, such as the set-top terminal 400 shown in FIG. 1.

Figure 4:
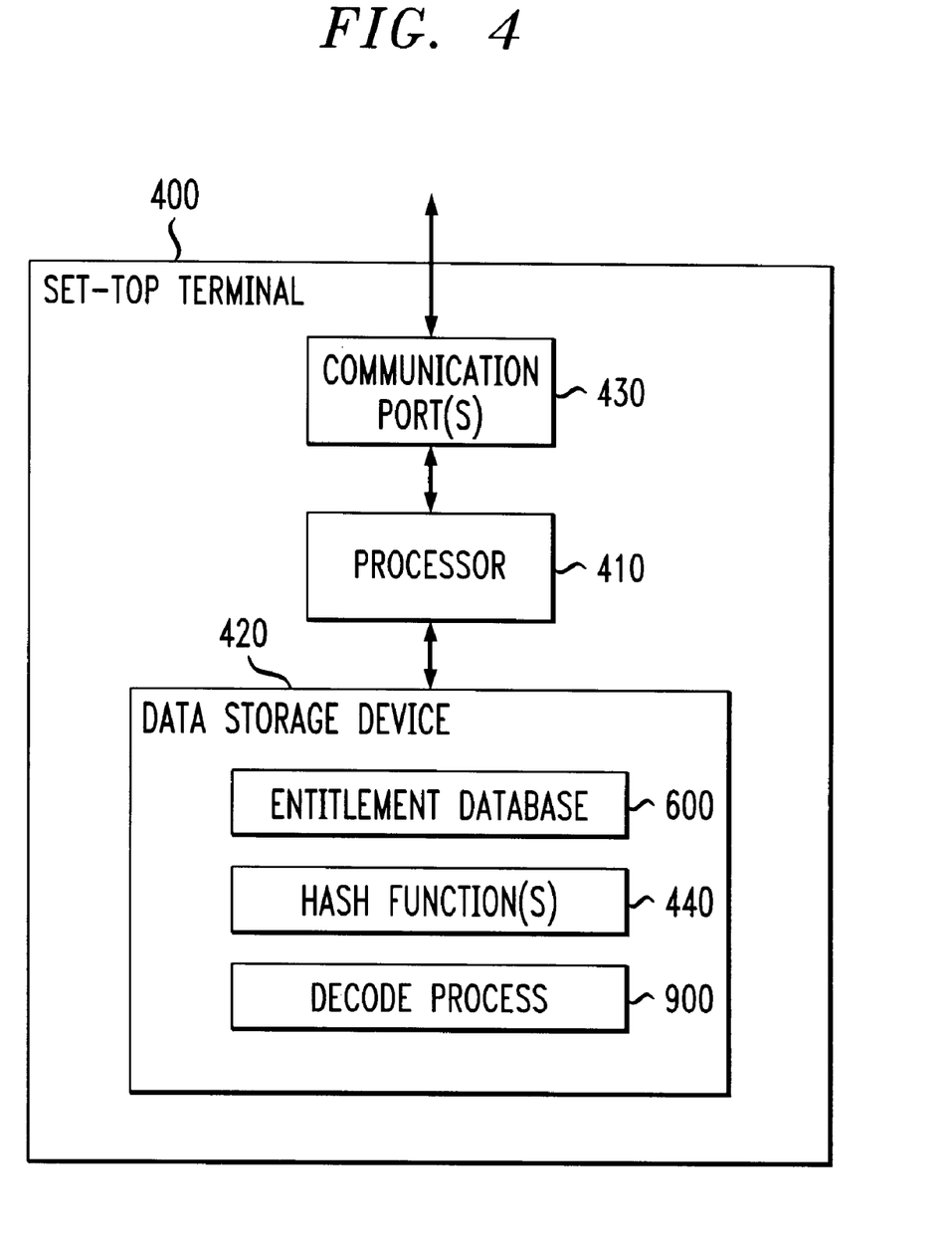
FIG. 4 is a schematic block diagram of an exemplary set-top terminal of FIG. 1.

FIG. 4 is a block diagram showing the architecture of an illustrative set-top terminal 400. The set-top terminal 400 may be embodied, for example, as a set-top terminal (STT) associated with a television, such as those commercially available from General Instruments Corp., as modified herein to execute the functions and operations of the present invention. The set-top terminal 400 includes a processor 410 and related memory, such as a data storage device 420, as well as a communication port 430, which operate in a similar manner to the hardware described above in conjunction with FIG. 3.

As discussed further below in conjunction with FIG. 6, the data storage device 420 includes an entitlement database 600 that may be stored in a secure portion of the data storage device 420. The entitlement database 600 includes those portions of the key tree 200 that are necessary to derive the program keys, $K_p$, for the programs to which the customer is entitled. In addition, the data storage device 420 includes the hash functions, $H_0$ and $H_1$, 440. In addition, as discussed further below in conjunction with FIG. 9, the data storage device 420 includes a decode process 900. Generally, the decode process 900 decrypts programs that a customer is entitled to, by using the received program identifier, p, and the stored entitlement information 600 to derive the program key, $K_p$, and then using the program key, $K_p$, to decrypt the program.

Figure 5:
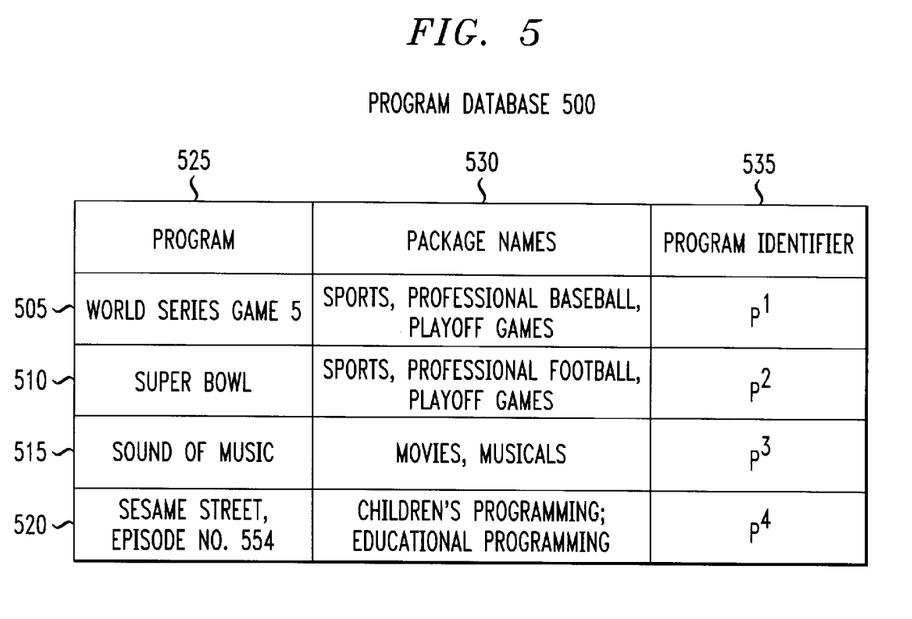
FIG. 5 illustrates a sample table from the program database of FIG. 3.

FIG. 5 illustrates an exemplary program database 500 that stores information on each program, p, which will be transmitted by the head-end server 300, for example, during a given billing period, including the packages the program belongs to and the corresponding program identifier, p. The program database 500 maintains a plurality of records, such as records 505–520, each associated with a different program. For each program identified by program name in field 525, the program database 500 includes an indication of the corresponding packages to which the program belongs in field 530 and the corresponding program identifier, p, in field 535.

Figure 6:
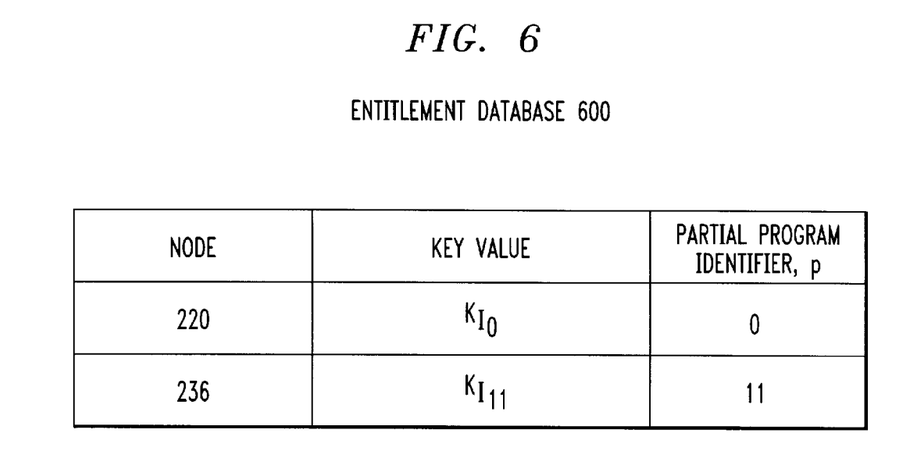
FIG. 6 illustrates a sample table from the entitlement database of FIG. 4.

FIG. 6 illustrates an exemplary entitlement database 600 that includes those portions of the key tree 200 that are necessary to derive the program keys, $K_p$, for the programs to which the customer is entitled. As previously indicated, T(u) is utilized to denote the subtree rooted at a node u, or equivalently, to denote the set of program identifiers, p, corresponding to the leaf nodes 240–247 in the subtree of node u. For example, if a customer is entitled to receive the four programs corresponding to the leaf nodes 240–243, the entitlement information would consist of the intermediate key associated with node 220. In this manner, the appropriate hash functions, $H_0$ and $H_1$, 440 can be used to derive the program keys, $K_p$, for each node 230, 232, 240–243 in the subtree of node 220, as necessary.

The exemplary entitlement database 600 shown in FIG. 6 corresponds to a customer that is entitled to receive the four programs corresponding to the leaf nodes 240–243, as well as the two programs corresponding to the leaf nodes 246–247. Thus, the entitlement information recorded in the entitlement database 600 consists of the intermediate keys associated with node 220 and node 236. For each node 220 and 236, the entitlement information recorded in the entitlement database 600 includes the intermediate key value, $K_{I_0}$ and $K_{I_{11}}$, respectively, and an indication of the corresponding partial program identifier, p. The manner in which the entitlement information 600 is generated by the entitlement information distribution process 700 based on packages of programs selected by a customer is discussed below in conjunction with FIG. 7.

Program Packaging

Small entitlements can be established for many sets of programs of varying size, using the tree scheme of the present invention. A target set, S, is established using the collection of programs to be packaged. A minimal set of tree nodes is obtained whose subtrees precisely cover the target set, S, as follows:

$$T(S) = Z \subseteq T \text{ such that } \bigcup_{u \in Z} T(u) = S, \text{ and } |Z| \text{ is minimal}$$

The entitlement information for the package, S, is the set of intermediate keys, $K_I$, held at the nodes of T(S). As indicated above, this set of keys allows the set-top terminal 400 to decrypt exactly the programs in S but nothing else. It is noted that, in principle, the tree scheme of the present invention can create entitlement information for any arbitrary target set, S. It is further noted, however, that if the program identifiers, p, are assigned arbitrarily then the entitlement information may become prohibitively large for the limited secure memory of the set-top terminals 400.

Processes

Figure 7:
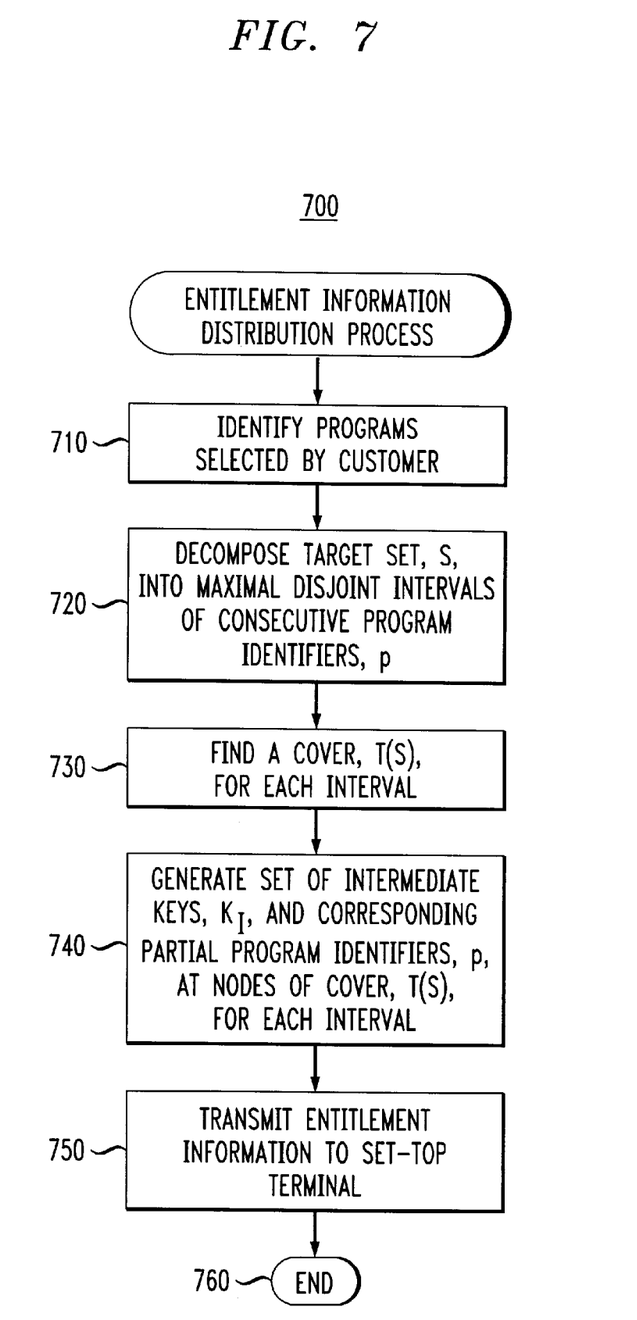
FIG. 7 is a flow chart describing an exemplary entitlement information distribution process as implemented by the head-end server of FIG. 3.

As discussed above, the head-end server 300 executes an entitlement information distribution process 700, shown in FIG. 7, to generate and distribute the entitlement information 600 required by each customer to access entitled programs. As previously indicated, the entitlement information 600 consists of the intermediate key value, $K_I$, and an indication of the corresponding partial program identifier, p, for each node of the key tree 200 that is necessary to derive the program keys, $K_p$, for the programs to which the customer is entitled.

Thus, the entitlement information distribution process 700 initially identifies the programs selected by the customer during step 710. Thereafter, the entitlement information distribution process 700 finds a minimal set of tree nodes, T(S), whose subtrees precisely cover the target set, S. The target set, S, is decomposed during step 720 into maximal disjoint intervals of consecutive program identifiers, p. It is noted that two program identifiers, p, are considered consecutive if the integers corresponding to the binary representations are consecutive. A cover, T(S), is then found for each interval during step 730. The set of intermediate keys, $K_I$, and corresponding partial program identifiers, p, held at the nodes of the cover, T(S), for each interval are generated during step 740. Finally, the generated entitlement information is downloaded by the head-end server 300 to the set-top terminal 400 during step 750, before program control terminates during step 760.

The number of intervals in the target set, S, is referred to as I(S). To compute a cover, T(S), for a single interval of program identifiers, p, on the order of n tree nodes must be visited in a key tree 200 of depth n. Thus, the time complexity of the entitlement information distribution process 700 is on the order of I(S)·n. Likewise, the size of the minimal cover, T(S), is on the order of I(S)·n. Programs with related content should be assigned program identifiers, p, that allow them to be packaged efficiently. In one implementation, basic packages are of the form all program identifiers, p, with a bit prefix μ. An entitlement for such a single-topic package is a single key in the key tree 200. Moreover, multi-topic packages can be assembled with no side-effects. The entitlement information is simply the set of keys for the individual topics that comprise the multi-topic package. In accordance with the present invention, a package defined by a prefix μ does not allow the set-top terminal 400 to decrypt programs with a 0 prefix of the same length.

Figure 8:
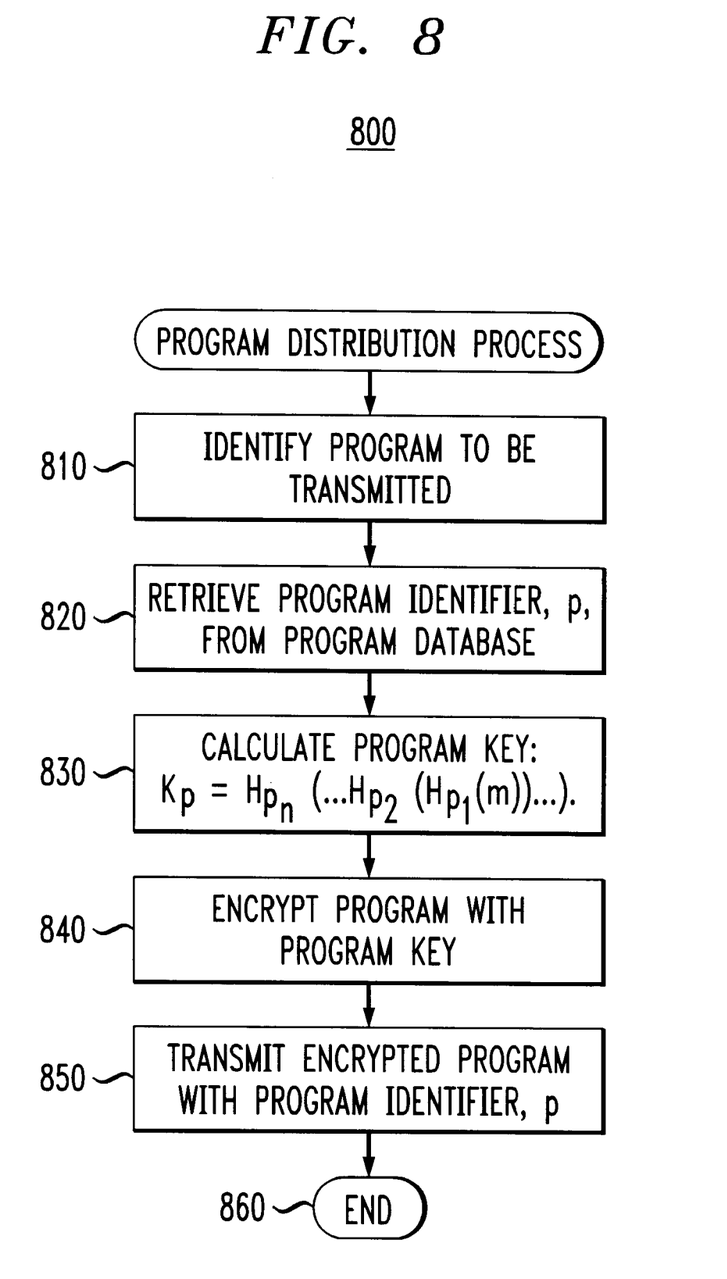
FIG. 8 is a flowchart describing an exemplary program distribution process as implemented by the head end server of FIG. 3.

As discussed above, the head-end server 300 executes a program distribution process 800, shown in FIG. 8, to derive the program key, $K_p$, based on the program identifier, p, assigned to the program and the master key, m, in order to encrypt and transmit the program with the program identifier, p. It is noted that the program distribution process 800, other than the actual transmission step, can be executed offline or in real-time. As illustrated in FIG. 8, the program distribution process 800 begins the processes embodying the principles of the present invention during step 810 by identifying a program to be transmitted.

Thereafter, the program distribution process 800 retrieves the program identifier, p, corresponding to the program from the program database 500, during step 820, and then calculates the program key, $K_p$, corresponding to the program during step 830. The program will then be encrypted during step 840 with the program key, $K_p$, calculated during the previous step. Finally, the program distribution process 800 will transmit the encrypted program together with the program identifier, p, during step 850, before program control terminates during step 860. It is noted that the program identifier, p, can be transmitted periodically interleaved throughout the transmission of the program information, so that a customer can change channels during a program and be able to derive the program key, $K_p$, which is required to decrypt the program. In an alternate embodiment, the program identifier, p, can be continuously transmitted on a separate control channel, such as a Barker channel.

Figure 9:
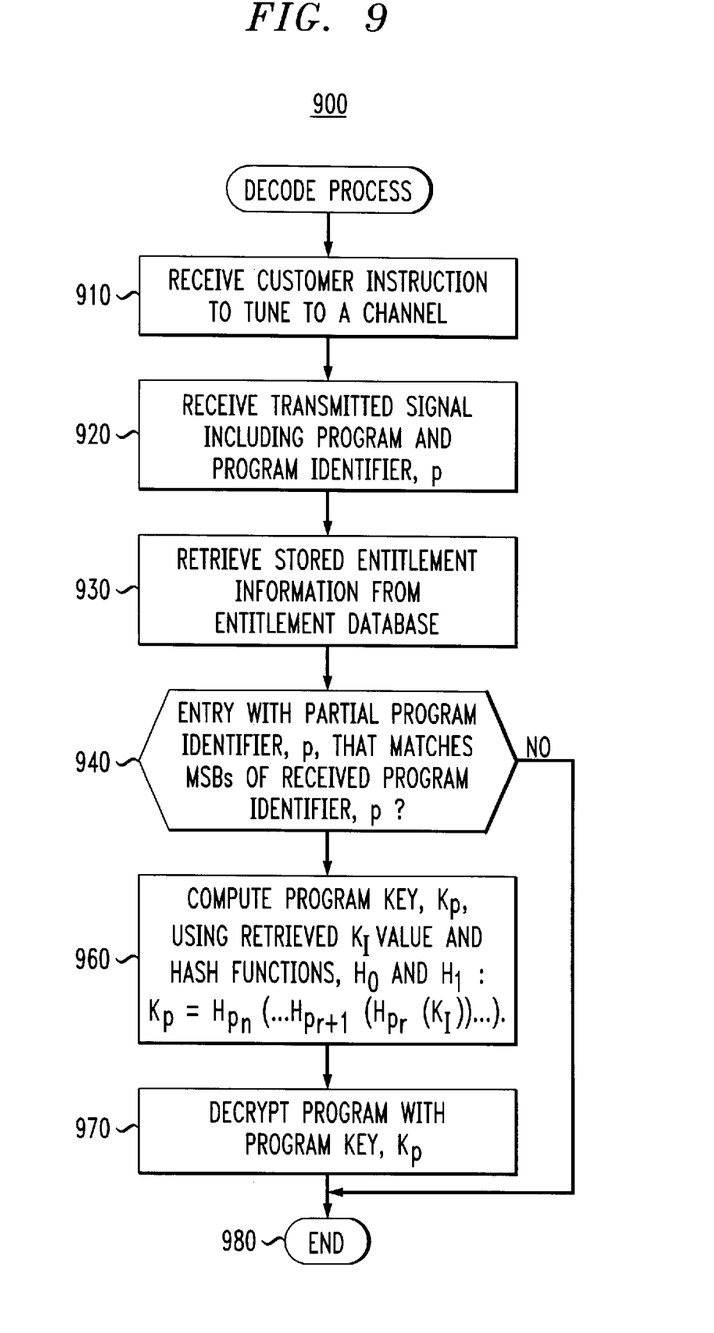
FIG. 9 is a flowchart describing an exemplary decode process as implemented by the set-top terminal of FIG. 4.

As discussed above, the set-top terminal 400 executes a decode process 900, shown in FIG. 9, to decrypt programs that a customer is entitled to, by using the received program identifier, p, and the stored entitlement information 600 to derive the program key, $K_p$, and then using the program key, $K_p$, to decrypt the program. As illustrated in FIG. 9, the decode process 900 begins the processes embodying the principles of the present invention during step 910, upon receipt of a customer instruction to tune to a particular channel.

Thereafter, the set-top terminal 400 will receive the appropriate signal during step 920, including the encrypted program and the transmitted program identifier, p. The decode process 900 then retrieves the stored entitlement information from the entitlement database 600 during step 930. A test is performed during step 940 to determine if with the transmitted program. If it is determined during step 940 that an entry does not exist in the entitlement database 600 having a partial program identifier, p, that matches the most significant bits of the received program identifier, p, then the customer is not entitled to the selected program and program control terminates during step 980.

If, however, an entry does exist in the entitlement database 600 having a partial program identifier, p, that matches the most significant bits of the received program identifier, p, then the customer is entitled to the selected program. Thus, the program key, $K_p$, is then calculated during step 960 using the intermediate key, $K_I$, retrieved from the entry of the entitlement database 600. Specifically, the program key, $K_p$ is computed by activating the appropriate hash function, $H_0$ or $H_1$, as directed by the value of each of the n–r low order bits of the program identifier, p, as follows:

$$K_p = H_{p_n}( \ldots H_{p_{r+1}}(H_{p_r}(K_I)) \ldots ).$$

Finally, the program is decrypted using the derived program key, $K_p$, during step 970, before program control terminates during step 980. It is noted that if the received program is not part of the customer's entitlement, then there is no entitlement information in the entitlement database 600 having a partial program identifier, p, that matches the low order bits of the program identifier, p, received with the transmitted program.

It is further noted that the decode process 900 can wait for the customer to request a particular channel before attempting to derive the decryption keys and determine whether the customer is entitled to the requested channel, as described above, or the decode process 900 can alternatively periodically scan all channels to obtain the transmitted program identifiers, p, in order to derive the decryption keys for storage in the data storage device 420 and predetermine the customer's entitlement.

Suitable Hash Functions

As previously indicated, if the hash function, H, is a pseudo-random bit generator, then the mapping of p→$K_p$ is provably a pseudo-random function. Thus, if the actual hash function, H, is cryptographically strong, then the encryption keys would be unpredictable. Accordingly, if a pirate only has access to the encrypted program broadcast, the knowledge that the keys were generated using the tree scheme of the present invention does not seem to help in breaking the encryption. Therefore, essentially the only concern is to ensure that the video encryption algorithm can withstand known plaintext attacks.

The hash function, H, should possess two properties. First, it must be hard to compute the input x given half of the image $H_0(x)$ or $H_1(x)$ for the hash function, H. This certainly holds for any cryptographic hash H, which is hard to invert even when both halves of the image are known. In addition, it must be hard to compute $H_0(x)$ even when $H_1(x)$ is known, and vice versa. In principle, it may be easier to complete a missing half-key when the other half is known, even if the function H is hard to invert. If this is the case, then a pirate who knows the program key, $K_p$ for a node u may be able to compute the key to a sibling node, v, and then to all the programs in the subtree of node v.

One advantage of the tree scheme in accordance with the present invention is that it makes merging pirated entitlements inefficient. Consider a pair of sibling programs, $p_1$ and $p_2$, and their parent node, u. Suppose that the pirate knows the program key, $K_p$, corresponding to both programs, $p_1$, and $p_2$, which are the two halves of $H(K_p(u))$. The pirate still cannot invert H and compute $K_p(u)$ since H is a cryptographic hash function. Thus, the merged pirated entitlements would have to contain both $K_p(p_1)$ and $K_p(p_2)$, rather than more compact $K_p(u)$. Thus, breaking into multiple set-top terminals 400 with cheap (but different) entitlements is not a good strategy for the pirate, since the combined entitlement will be very large.

As previously indicated, suitable pseudo-random hash functions are discussed, for example, in O. Goldreich et al., "How to Construct Random Functions," J. ACM, 33:792–807 (1986), incorporated by reference above.

It is to be understood that the embodiments and variations shown and described herein are merely illustrative of the principles of this invention and that various modifications may be implemented by those skilled in the art without departing from the scope and spirit of the invention.

We claim:

1. A method for transmitting a program having restricted access to an end-user, said method comprising the steps of:
   assigning a program identifier to said program, said program identifier having a binary value;
   defining at least one master key;
   encrypting said program using a program key, said program key obtained by applying at least one hash function to said master key based on a binary value of each bit position of said program identifier; and
   transmitting the encrypted program together with said program identifier to said end-user.

2. The method according to claim 1, wherein said program identifier consists of n bits, and one of said hash functions is applied for each of the n bit positions of the program identifier depending on the corresponding bit value of the program identifier.

3. The method according to claim 1, further comprising the step of providing entitlement information to said end-users based on a set of programs obtained by said end-user.

4. The method according to claim 3, wherein said entitlement information includes a portion of a key tree based on the set of programs obtained by said end-user.

5. The method according to claim 3, wherein said end-user uses said program identifier to derive said program key from said entitlement information.

6. The method according to claim 1, wherein said program identifier is interleaved with the transmission of said encrypted program.

7. The method according to claim 1, wherein said program identifier is transmitted on a control channel.

8. A method for transmitting a program to a plurality of end-users, said method comprising the steps of:
   encrypting said program using a program key, said program having a program identifier, said program key obtained by recursively applying a hash function to a master key based on the binary value of each bit position of said program identifier; and
   transmitting the encrypted program and said program identifier to said end-user.

9. The method according to claim 8, wherein said program identifier consists of n bits, and a hash function is applied for each of the n bit positions of the program identifier depending on the corresponding bit value of the program identifier.

10. The method according to claim 8, further comprising the step of providing entitlement information to said end-users based on a set of programs obtained by said end-user.

11. The method according to claim 10, wherein said entitlement information includes a portion of a key tree based on the set of programs obtained by said end-user.

12. The method according to claim 10, wherein said end-user uses said program identifier to derive said program key from said entitlement information.

13. The method according to claim 8, wherein said program identifier is interleaved with the transmission of said encrypted program.

14. The method according to claim 8, wherein said program identifier is transmitted on a control channel.

15. A method for transmitting a program associated with at least one package of programs to a plurality of end-users, said method comprising the steps of:
   providing entitlement information to said end-users based on the package of programs obtained by said end-users;
   encrypting said program using a program key, said program having a program identifier, said program key obtained by recursively applying a hash function to a master key based on the binary value of each bit position of said program identifier; and
   transmitting said program identifier with said encrypted program to said end-users, said end-users deriving said program key from said entitlement information if said end-user is entitled to said program.

16. The method according to claim 15, wherein said program identifier consists of n bits, and one of said hash functions is applied for each of the n bit positions of the program identifier depending on the corresponding bit value of the program identifier.

17. The method according to claim 15, wherein said entitlement information includes a portion of a key tree based on the set of programs obtained by said end-user.

18. The method according to claim 15, wherein said end-user uses said program identifier to derive said program key from said entitlement information.

19. The method according to claim 15, wherein said program identifier is interleaved with the transmission of said encrypted program.

20. The method according to claim 15, wherein said program identifier is transmitted on a control channel.

21. A method for decoding an encrypted program, said method comprising the steps of:
   receiving entitlement information from a provider of said program, said entitlement information including a portion of a key tree based on a set of programs obtained by said customer wherein the key tree is based on recursive hashes;
   receiving said encrypted program and a program identifier, said encrypted program encrypted with a program key;

deriving said program key from said program identifier and said portion of said key tree; and decrypting said encrypted program using said program key.

22. The method according to claim 21, wherein said program identifier consists of n bits, a master key is placed at the root of said key tree and said key tree is generated by applying a hash function to each node of said key tree, until n tree levels have been created.

23. A method for decoding an encrypted program, said method comprising the steps of:

receiving entitlement information from a provider of said program, said entitlement information including at least one intermediate key from a key tree based on a set of programs obtained by said customer;

receiving said encrypted program and a program identifier, said encrypted program encrypted with a program key;

deriving said program key from said program identifier and said intermediate key by recursively applying a hash function to said intermediate key based on a binary value of each bit position of said program identifier; and decrypting said encrypted program using said program key.

24. The method according to claim 23, wherein said program identifier consists of n bits and said intermediate key corresponds to an intermediate node at a level r of said key tree, and wherein said hash function is applied to said intermediate key n–r times.

25. A system for transmitting a program having restricted access to an end-user, said system comprising:

a memory for storing a master key and computer readable code; and a processor operatively coupled to said memory, said processor configured to:

assign a program identifier to said program, said program identifier having a binary value;

define at least one master key;

encrypt said program using a program key, said program key obtained by recursively applying at least one hash function to said master key based on a binary value of each bit position of said program identifier; and transmit the encrypted program together with said program identifier to said end-user.

26. A system for transmitting a program having restricted access to an end-user, said system comprising:

a memory for storing a master key and computer readable code; and a processor operatively coupled to said memory, said processor configured to:

encrypt said program using a program key, said program having a program identifier, said program key obtained by recursively applying a hash function to a master key based on a binary value of each bit position of said program identifier; and transmit the encrypted program and said program identifier to said end-user.

27. A system for decoding an encrypted program, said system comprising:

a memory for storing a master key and computer readable code; and a processor operatively coupled to said memory, said processor configured to:

receive entitlement information from a provider of said program, said entitlement information including a portion of a key tree based on a set of programs obtained by said customer wherein the key tree is based on recursive hashes;

receive said encrypted program and a program identifier, said encrypted program encrypted with a program key;

derive said program key from said program identifier and said portion of said key tree; and decrypt said encrypted program using said program key.

28. An article of manufacture comprising:

a computer readable medium having computer readable code means embodied thereon, said computer readable code means comprising:

a step to assign a program identifier to a program, said program identifier having a binary value;

a step to define at least one master key;

a step to encrypt said program using a program key, said program key obtained by recursively applying at least one hash function to said master key based on a binary value of each bit position of said program identifier; and a step to transmit the encrypted program together with said program identifier to said end-user.

29. An article of manufacture comprising:

a computer readable medium having computer readable code means embodied thereon, said computer readable code means comprising:

a step to receive entitlement information from a provider of a program, said entitlement information including a portion of a key tree based on a set of programs obtained by a customer wherein the key tree is based on recursive hashes;

a step to receive an encrypted program and a program identifier, said encrypted program encrypted with a program key;

a step to derive said program key from said program identifier and said portion of said key tree; and a step to decrypt said encrypted program using said program key.

* * * * *

UNITED STATES PATENT AND TRADEMARK OFFICE
CERTIFICATE OF CORRECTION

PATENT NO. : 6,735,313 B1
DATED : May 11, 2004
INVENTOR(S) : Bleichenbacher et al.

It is certified that error appears in the above-identified patent and that said Letters Patent is hereby corrected as shown below:

Column 11,
Line 44, before "applying" and after "by" insert -- recursively --.
Line 56, before "based" replace "users" with -- user --.

Column 12,
Line 16, before "based" replace "users" with -- user --.

Signed and Sealed this

Sixth Day of September, 2005

JON W. DUDAS
*Director of the United States Patent and Trademark Office*